United States Patent
Syed et al.

(10) Patent No.: US 11,886,746 B1
(45) Date of Patent: Jan. 30, 2024

(54) ALGORITHMIC TCAM WITH STORAGE ACTIVITY-BASED READ

(71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: DreamBig Semiconductor Inc., San Jose, CA (US)

( * ) Notice: Subject to any disclaimer, the term of this patent is extended or adjusted under 35 U.S.C. 154(b) by 32 days.

(21) Appl. No.: 17/710,572

(22) Filed: Mar. 31, 2022

Related U.S. Application Data

(60) Provisional application No. 63/168,921, filed on Mar. 31, 2021.

(51) Int. Cl.
*G06F 3/06* (2006.01)
*G11C 15/04* (2006.01)
(Continued)

(52) U.S. Cl.
CPC .......... *G06F 3/0659* (2013.01); *G06F 3/0604* (2013.01); *G06F 3/0634* (2013.01); *G06F 3/0679* (2013.01); *G06F 16/90339* (2019.01); *G11C 15/04* (2013.01); *G06F 11/1064* (2013.01)

(58) Field of Classification Search
CPC .... G06F 3/0659; G06F 3/0604; G06F 3/0634; G06F 3/0679; G06F 16/90339; G06F 11/1064; G11C 15/04
See application file for complete search history.

(56) References Cited

U.S. PATENT DOCUMENTS

| 7,643,353 B1 | 1/2010 | Srinivasan et al. |
| 8,195,873 B2 | 6/2012 | Gazit |

(Continued)

FOREIGN PATENT DOCUMENTS

| WO | WO-98/07160 A2 | 2/1998 |
| WO | WO-2007038805 A1 | 4/2007 |

OTHER PUBLICATIONS

"U.S. Appl. No. 17/710,629, Non Final Office Action dated May 24, 2023", 10 pgs.

(Continued)

*Primary Examiner* — Sean D Rossiter
(74) *Attorney, Agent, or Firm* — Schwegman Lundberg & Woessner, P.A.

(57) ABSTRACT

A method is provided to control a content addressable memory that includes multiple integrated circuit memory devices that include common memory address locations and that are coupled for simultaneous access to the common memory address locations, the method comprising; determining a hash value, based upon a received key value, that corresponds to a common memory address location of the multiple memory devices; providing activity status information for multiple common memory address locations of the memory devices; selecting a memory devices from which to output stored content data from the corresponding common memory address location, based upon storage activity status information; and causing the selected one or more memory devices to output stored content data.

15 Claims, 9 Drawing Sheets

(51) Int. Cl.
*G06F 16/903* (2019.01)
*G06F 11/10* (2006.01)

(56) References Cited

U.S. PATENT DOCUMENTS

| | | |
|---|---|---|
| 9,094,307 B1 | 7/2015 | Edsall et al. |
| 9,262,312 B1 | 2/2016 | Gazit et al. |
| 9,306,851 B1 | 4/2016 | Gazit et al. |
| 9,424,366 B1* | 8/2016 | Gazit .................... G11C 15/00 |
| 9,639,501 B1 | 5/2017 | Gazit et al. |
| 10,254,968 B1 | 4/2019 | Gazit et al. |
| 10,318,587 B1 | 6/2019 | Bosshart et al. |
| 10,778,721 B1 | 9/2020 | Holbrook et al. |
| 10,887,233 B2 | 1/2021 | Labonte et al. |
| 11,683,039 B1 | 6/2023 | Syed et al. |
| 11,720,492 B1 | 8/2023 | Syed et al. |
| 2009/0190404 A1 | 7/2009 | Roohparvar |
| 2012/0198107 A1* | 8/2012 | McKean .............. G06F 3/0647 710/40 |
| 2013/0242632 A1 | 9/2013 | Wada |
| 2015/0006808 A1 | 1/2015 | Miller et al. |
| 2015/0121034 A1* | 4/2015 | Steele, Jr. ........... G06F 12/1018 711/216 |
| 2015/0169467 A1 | 6/2015 | Chase et al. |
| 2017/0040059 A1 | 2/2017 | Arsovski et al. |
| 2017/0242618 A1* | 8/2017 | Tran ........................ G06F 3/061 |
| 2018/0039662 A1 | 2/2018 | Asai et al. |
| 2023/0016020 A1 | 1/2023 | Kim et al. |
| 2023/0251782 A1 | 8/2023 | Chang et al. |

OTHER PUBLICATIONS

"U.S. Appl. No. 17/710,629, Response filed Jul. 10, 2023 to Non Final Office Action dated May 24, 2023", 16 pgs.
"U.S. Appl. No. 17/710,678, Corrected Notice of Allowability dated Mar. 30, 2023", 4 pgs.
"U.S. Appl. No. 17/710,678, Corrected Notice of Allowability dated Apr. 10, 2023", 4 pgs.
"U.S. Appl. No. 17/710,678, Corrected Notice of Allowability dated Jun. 26, 2023", 2 pgs.
"U.S. Appl. No. 17/710,678, Notice of Allowance dated Mar. 16, 2023", 19 pgs.
"U.S. Appl. No. 17/710,891, Corrected Notice of Allowability dated May 17, 2023", 2 pgs.
"U.S. Appl. No. 17/710,891, Notice of Allowance dated Feb. 8, 2023", 8 pgs.
"U.S. Appl. No. 17/710,891, Response filed Jan. 18, 2023 to Ex Parte Quayle Action mailed Nov. 25, 2022", 5 pgs.
Bremier-Barr, Anat, et al., "Encoding Short Ranges in TCAM Without Expansion: Efficient Algorithm and Applications", SPAA '16, Jul. 11-13, 2016, Pacific Grove, CA, (2016), 35-46.
Kyungbae, Park, "Resource-Efficient SRAM-Based Ternary Content Addressable Memory Ali Ahmed", Sanghyeon Baeg IEEE Transactions on Very Large Scale Integration (VLSI) Systems Year: 2017 | vol. 25, Issue: 4 | Journal Article | Publisher: IEEE, (Jan. 1, 2017).
Liu, Huan, "Efficient Mapping of Range Classifier into Ternary-CAM", Proceedings 10th Symposium on High Performance Interconnects (HOTI '02), (2002), 6 pgs.
Meiners, Chad R., et al., "Bit Weaving: A Non-Prefix Approach to Compressing Packet Classifiers in TCAMs", IEEE/ACM Transactions on Networking, vol. 20, No. 2, (Apr. 2011), 488-500.
Ullah, Inayat, et al., "EE-TCAM: An Energy-Efficient SRAM-Based TCAM on FPGA", Electronics, 7(9), 186, (2018), 15 pgs.
Ullah, Zahid, et al., "E-TCAM: An Efficient SRAM-Based Architecture for TCAM", Circuits, Systems, and Signal Processing, 33, (2014), 3123-3144.
Vegesna, S. M. Srinivasavarma, et al., "A Novel Rule Mapping on TCAM for Power Efficient Packet Classification", ACM Transactions on Design Automation of Electronic Systems, vol. 24, .No. 5, Article 48, (Jun. 2019), 23 pgs.
Zhang, Chaoqin, et al., "RETCAM: An Efficient TCAM Compression Model for Flow Table of OpenFlow", Journal of Communications and Networks, vol. 22, No. 6, (Dec. 2020), 484-491.
"U.S. Appl. No. 17/710,891, Ex Parte Quayle Action mailed Nov. 25, 2022", 7 pgs.
Demetriades, Socrates, et al., "An Efficient Hardware-basedMulti-hash Scheme for High Speed IP Lookup", Department of Computer Science University of Pittsburg, (Jun. 2008), 8 pages.
Meiners, Chad R., et al., "Algorithmic Approaches to Redesigning TCAM Based Systems", *SIGMETRICS* Jun. 2 to Jun. 6, 2008, (Jun. 2008).
Pagiamtzis, Kostas, et al., "Content-Addressable Memory (CAM) Circuits and Architectures: A Tutorial and Survey", *IEEE Journal of Solid-State Circuits*, 41(3), (Mar. 2006), 16 pages.
Ravikumar, V. C., et al., "TCAM Architecture for IP Lookup Using Prefix Properties", Published by the IEEE Computer Society 0272-1732/04, (Mar.-Apr. 2004), 10 pages.
Sheu, Jang-Ping, et al., "Efficient TCAM Rules Distribution Algorithms in Software-Defined Networking", *IEEE Transactions on Network and Service Management*, 15(2), (Jun. 2018), 12 pages.
Song, Yibo, et al., "A Low-power Content-Addressable Memory (CAM) Using Pipelined Search Scheme", DOI:10.1007/978-90-481-9151-2-71, (Dec. 2009), 7 pages.
Trinh, Nguyen, et al., "Algorithmic TCAM on FPGA with data collision approach", *Indonesian Journal of Electrical Engineering and Computer Science*, 22(1), (Apr. 2021), 89-96.
"U.S. Appl. No. 17/710,798, Ex Parte Quayle Action dated Sep. 8, 2023", 8 pgs.
"U.S. Appl. No. 17/710,798, Response filed Sep. 19, 2023 to Ex Parte Quayle Action dated Sep. 8, 2023", 8 pgs.

* cited by examiner

| KEY | RULE |
|---|---|

Fig. 2

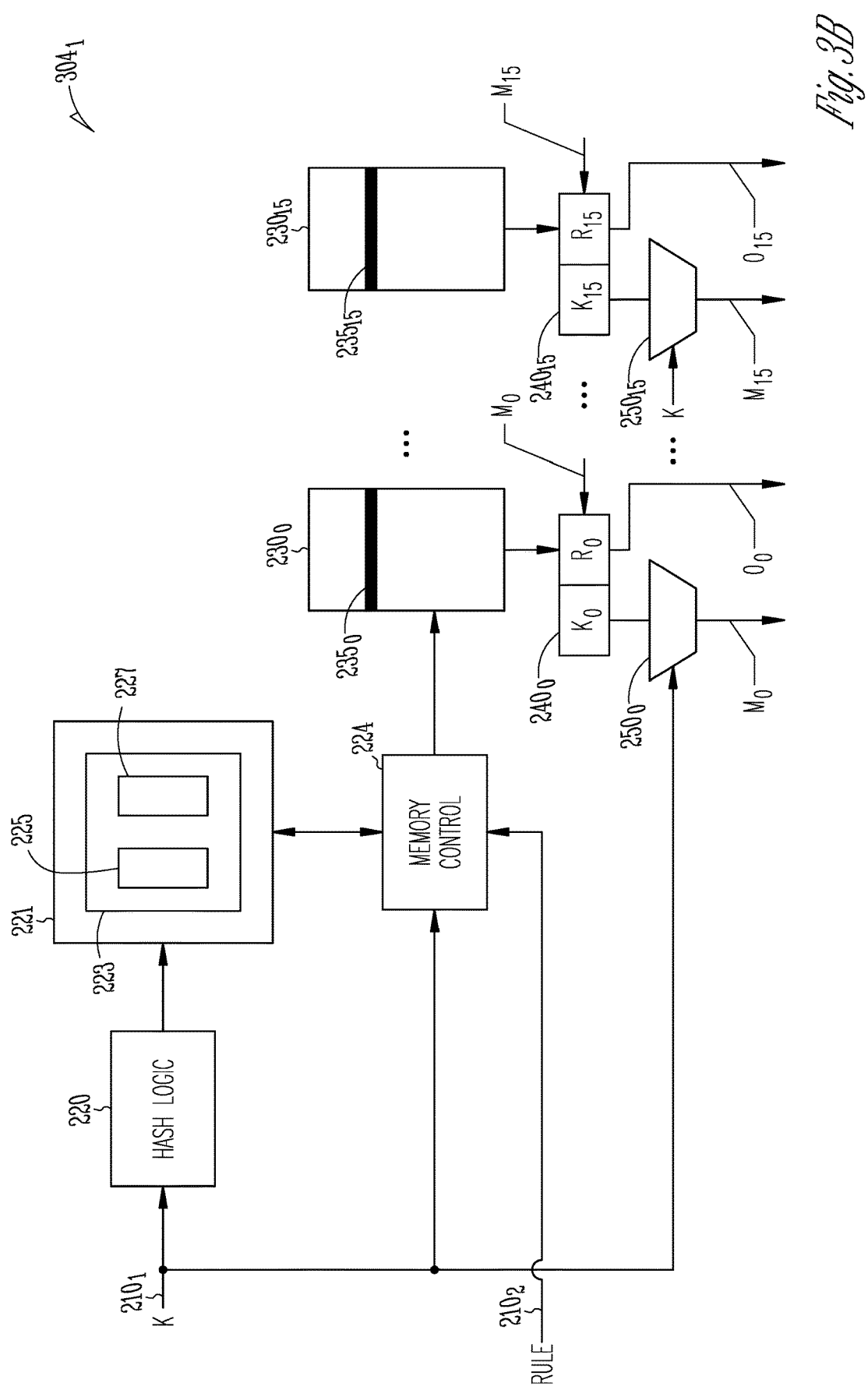

US 11,886,746 B1

ALGORITHMIC TCAM WITH STORAGE ACTIVITY-BASED READ

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name just a few examples. Many network devices (e.g., bridges, switches, routers, gateways, network proxies), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted. Algorithmic RAM-based TCAM typically uses two-bit values stored in RAM to represent individual ternary states. In other words, each of TCAM logic 0, logic 1, and X often is represented in RAM-based TCAM as a different combination of two binary bits. TCAMs have suffered from large use of resources. There is a need to reduce resources required for TCAM.

SUMMARY

In one aspect, a content addressable memory circuit is provided that includes an interface to receive a key value and multiple integrated circuit memory devices that include common memory address locations and that are coupled for simultaneous access. Hash logic is operative to determine a hash value based upon a received key value. The determined hash value corresponds to a common memory address of the memory devices. Storage activity status information is stored in memory for multiple common memory address locations for each memory device. Memory controller logic configured is to select one or more memory devices from which to output stored content data from the corresponding common memory address location, based upon the storage activity status information for the corresponding common memory address location for each memory device. The memory controller logic causes one or more selected memory devices to output stored content data.

In another aspect, a method is provided to control a content addressable memory that includes multiple integrated circuit memory devices that include common memory address locations and that are coupled for simultaneous access to the common memory address locations. The method includes determining a hash value based upon a received key value. The hash value corresponds to a common memory address location of the multiple memory devices. Storage activity status information is stored in a memory device for multiple common memory address locations of the memory devices. One or more memory devices are selected from which to output stored content data from the corresponding common memory address location, based upon storage activity status information of the memory devices for the corresponding common memory address location The selected one or more memory devices output stored content data.

In another aspect, a method is provided to control a content addressable memory that includes multiple integrated circuit memory devices that include common memory address locations and that are coupled for simultaneous access to the common memory address locations. The method includes determining a hash value based upon a received key value. The hash value corresponds to a common memory address location of the multiple memory devices. Storage activity status information is stored in a memory device for multiple common memory address locations of the memory devices. The received key value is stored in a memory device at the corresponding common memory address location. The storage activity status information is adjusted for the corresponding common memory address location for the memory device in which the key value is stored.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is an illustrative drawing representing an example content data record that includes a key and an associated rule searched based upon the key.

FIG. 3B is an illustrative drawing showing an example of memory module of the TCAM system of FIG. 3A.

DETAILED DESCRIPTION

Overview

An example algorithmic TCAM includes multiple memory devices that have matching memory locations that share memory addresses in common; the same common memory address, e.g., a worldline, can identify matching memory locations in different memory devices that correspond to the common (same) memory address. The example TCAM uses a hash index to associate a common memory address location, such as a wordline, at multiple memory devices with one or more keys and uses a storage activity index to indicate any memory devices that store current content data at a matching memory location corresponding to a common memory address identifier.

During a write operation, a key is used to determine a hash value in the hash index, which is used to determine a common memory address shared by the multiple memory devices, such as a common wordline address. During the write operation, the content data is stored at a memory location at one or more of the memory devices corresponding to the determined common memory address. During the write operation, activity information is input to the activity index to identify the one or more memory devices at which the content data is stored.

During a read operation, a key is used to determine a hash value in the hash index to determine a common memory address shared by multiple memory devices, such as a shared word line. During the read operation, the storage activity index is used to determine, which if any of the multiple memory devices currently have content data stored at a memory location corresponding to the common memory address determined based upon the key. During the read operation, only those memory devices are searched that the storage activity index indicates to store current content data at the matching memory locations determined based upon the key to share a common memory address.

The use of an activity index reduces the number of memory devices accessed during a content search to be only those memory devices in which content data currently is stored at a common memory location determined based upon the key.

Network Device

Figure 1:
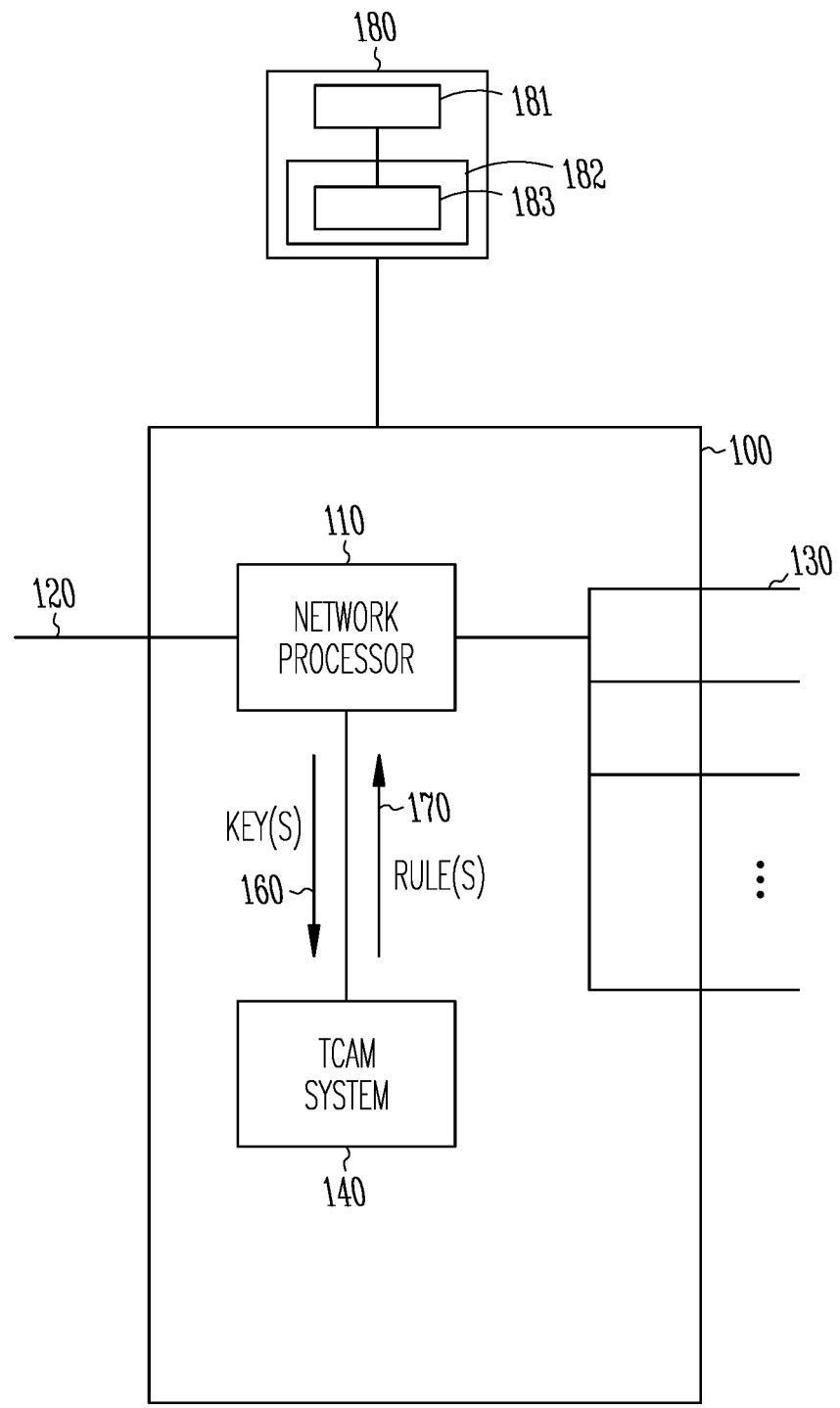
FIG. 1 is an illustrative drawing showing an example network device in accordance with some embodiments.

FIG. 1 is an illustrative drawing showing an example network device 100. The network device 100 can include one or more integrated circuit (IC) devices, a larger device, such as a router or switch, or a combination of these. In some implementations, the network device 100 is coupled with a computing machine 180 within a network communications apparatus. The computing machine 180 can include multiple processor circuits 181 coupled to non-transitory memory 182 that includes instructions 183 to configure the computing machine 180 to perform operations described herein. In some implementations, the network device 100 is a network communications apparatus and includes the computing machine 180. The network device 100 can be coupled with a computer network, such as a local area network (LAN) or a wide area network (WAN), and processes data packets that comprise ordered sequences of binary data values.

The network device 100 includes a network processor device 110, which receives the packets or portions of packets on an input port or interface 120. The network processor 110 parses incoming packet information to identify relevant data fields that provide information for handling network operations, such as routing and forwarding. The network processor 110 can be coupled with a TCAM-based network rules search engine 140, hereinafter referred to as the "TCAM system" 140, which assists in determining appropriate actions to take in response to receipt of packets over a network. The network processor 110 extracts information from the packets, referred to as key information 160. The key information is used to identify rules that determine appropriate actions to take in response to the received packets. The key information represents data bits within a packet that indicate packet information such as network addresses or portions thereof, port numbers, other header and trailer information, or combinations thereof, for example. The network processor 110 can generate key information, also referred as "keys", that use ternary value bits, which can have any of three states, logic 0, logic 1, or X ("don't care"), to represent the binary bits extracted from a packet. In general, ternary value bits within a key that represent a logic value 0 or a logic value 1 contribute to identifying a rule that determines an action to take based upon a packet represented by the key, and ternary value bits within a key that represent an X state do not contribute to identifying a rule that determines an action take based upon the packet represented by the key.

Figure 2:
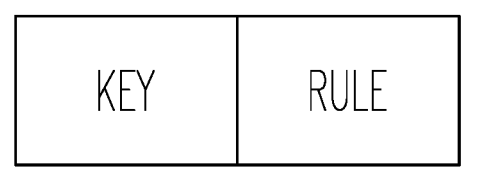

The network processor 110 sends ternary key information 160 to the TCAM system 140, which stores rules associated with such key information that indicate corresponding action to take. In response to receipt of key information 160 corresponding to a packet, the TCAM system 140 returns one or more corresponding rules 170 identified using the key information 160. The network processor 110 determines actions to take based on the returned one or more rules 170. Such actions can include outputting a packet on a selected output port or interface 130 or dropping a packet, as appropriate, for example. The TCAM system 140 includes one or more memory devices to store keys in association with corresponding rules 170. Matches between previously stored keys and keys provided by the network processor 110, in response to received packets, are searched to identify rules to use to route or switch the received packets. FIG. 2 is an illustrative drawing representing an example content data record, stored in a memory device, that includes a key and an associated rule searched based upon the key.

TCAM System

Figure 3A:
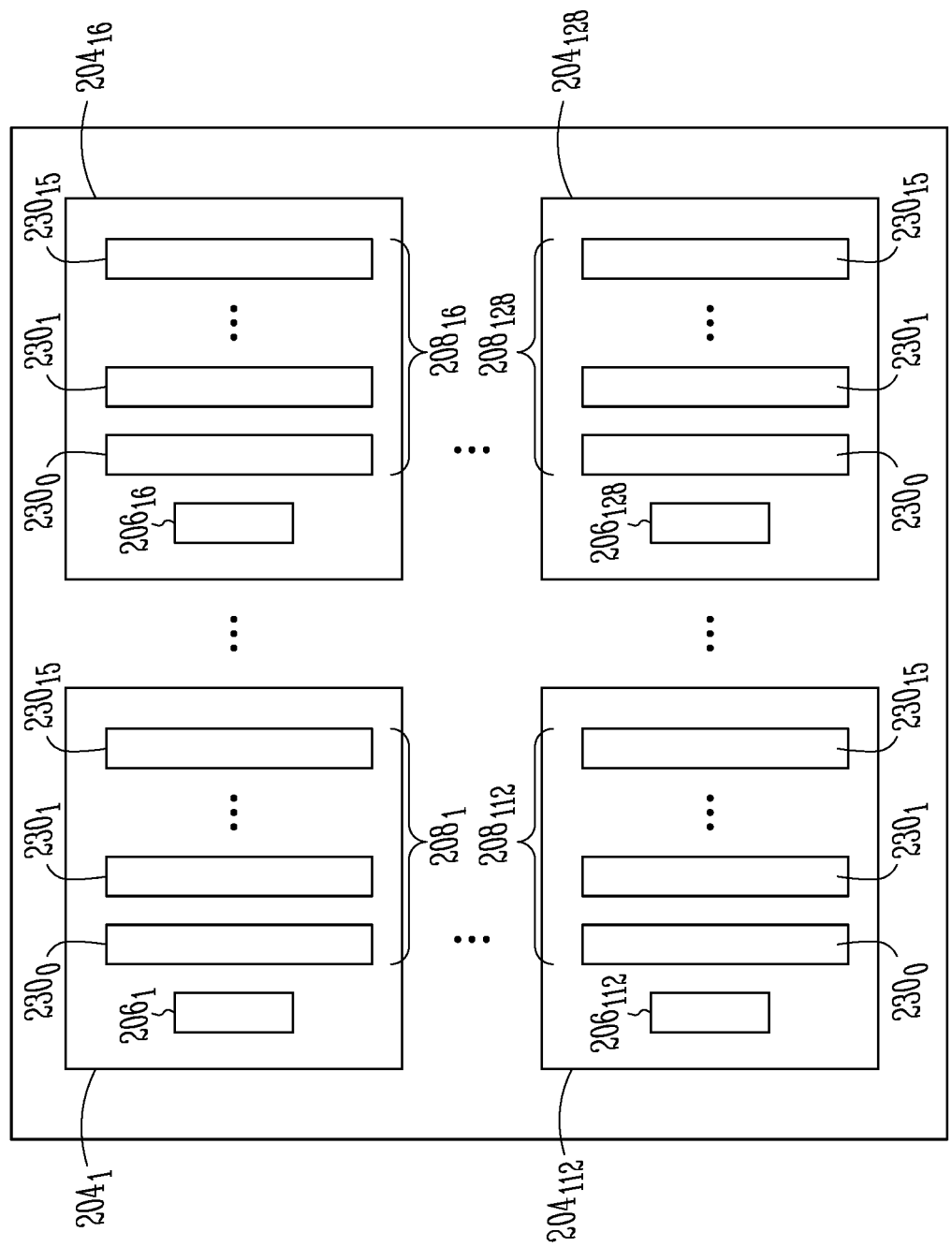
FIG. 3A is an illustrative drawing representing an example integrated circuit TCAM system that includes multiple TCAM memory modules.

FIG. 3A is an illustrative drawing representing an example integrated circuit TCAM system 140 that includes multiple TCAM memory modules $204_1$-$204_{128}$. Each TCAM memory module $204_1$-$204_{128}$ includes a corresponding hash RAM $206_1$-$206_{128}$ and a corresponding data RAM array $208_1$-$208_{128}$. Each data RAM array includes multiple data RAMs. More specifically, each data RAM array includes 16 data RAMs. For example, a first data RAM array $208_1$ includes data RAMs $230_0$-$230_{15}$. A 128th data RAM array $204_{128}$ includes data RAMs $230_0$-$230_{15}$. The TCAM system 202 is shown with 128 TCAM memory modules and 16 data RAMs per TCAM memory module. However, an example integrated circuit TCAM system 202 can include a smaller number of TCAM memory modules such as 64 TCAM memory modules or a larger number of TCAM memory modules such as 256 TCAM modules and can include a different number of data RAMs per TCAM module, for example. FIG. 3B is an illustrative drawing showing details of an example TCAM memory module $204_1$ of the TCAM system 202, in accordance with some embodiments. The memory module $204_1$ includes an input interface $210_1$ on which a ternary key is received, an input interface $210_2$ on which a corresponding rule is received hash logic circuitry 220, an integrated circuit storage device 221 that stores a hash-based storage structure 223, which includes a hash table 225 and a storage status information structure 227, storage control logic circuity 224, and multiple memory devices $230_0$-$230_{15}$. The hash logic 220 produces hash values that indicate locations in the hash table 225 in which to store address pointers to indicate memory location segments within the memory devices $230_0$-$230_{15}$ where key values and corresponding rules are stored. The memory control logic 224 controls access to memory location segments memory devices $230_0$-$230_{15}$ based upon address pointers within the hash table 225.

The memory devices $230_0$-$230_{15}$ can include integrated circuit RAM memory devices of various types, such Static RAM (SRAM), Dynamic RAM (DRAM), Synchronous DRAM (SDRAM), Flash RAM, etc. For example, each memory device $230_0$-$230_{15}$ can be a 512×256 RAM. In addition, each of memory devices $230_0$-$230_{15}$ can have an associated output buffer circuit $240_0$-$240_{15}$ and comparator circuit $250_0$-$250_{15}$.

Each memory address of the example first memory module $204_1$ corresponds to sixteen memory location segments, e.g., wordlines, one within each of the memory devices $230_0$-$230_{15}$. During each read or write, each of the sixteen memory devices $230_0$-$230_{15}$ is simultaneously accessed using a common shared memory address. The example memory module $204_1$ includes sixteen memory devices $230_0$-$230_{15}$. However, the number of memory devices employed in a memory module $204_1$(e.g., one, two, four, eight, sixteen, etc.) can vary with implementation. The hash logic 220 can be implemented in hardware or software. For instance, an example memory module $204_1$ can use the computing machine 180 to implement the hash logic 220. The hash logic 220 is operable during data write operations to determine hash values based upon received keys, used to determine hash value table locations in which to store pointers to memory address locations within the multiple memory devices $23_0$-$230_{15}$ at which to store the received key. The hash logic 220 is operable during data read operations to determine hash values based upon received keys, to match with address pointers stored in the hash table 222, that indicate memory segment locations within memory devices $230_0$-$230_{15}$ from which to read previously stored keys and associated rules.

The hash logic 220 uses a logical or mathematical hash function to determine hash values based upon one or more ternary bits within key values received at the interface $210_1$. The memory controller circuit 224 manages the flow of data going to and from the memory devices $230_0$-$230_{15}$. More particularly, the memory controller uses the hash values to determine memory location segments in the memory devices $230_0$-$230_{15}$ to access during reads and writes. The hash logic 220 receives a key as input at interface 210 and based upon the received key, generates a value referred to as a hash value or hash that corresponds to a common memory segment, e.g., a common wordline, that is present within each of the memory devices $230_0$-$230_{15}$.

Figure 4:
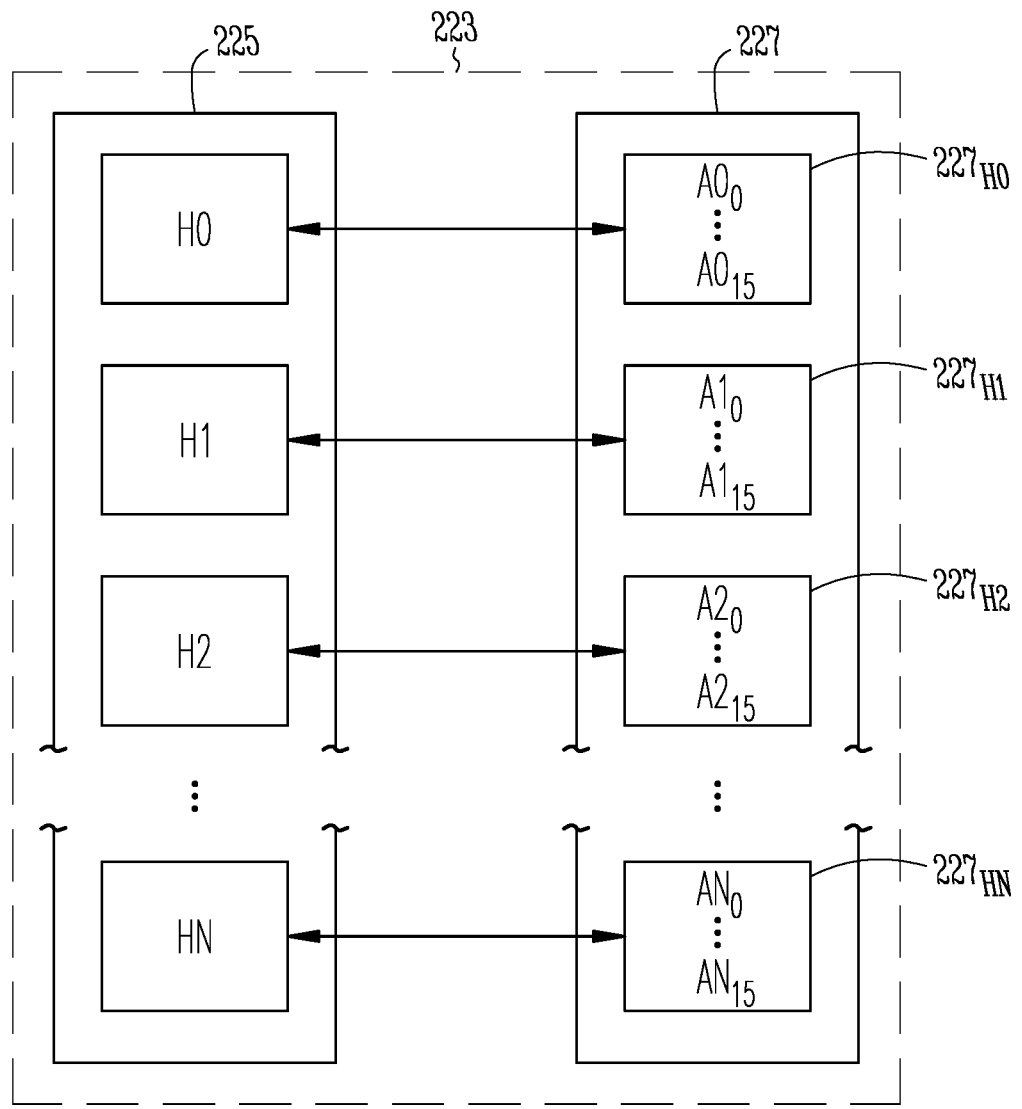
FIG. 4 is an illustrative drawing showing certain details of an example hash-based storage structure that includes a hash table and an associated storage address status information structure.

FIG. 4 is an illustrative drawing showing certain details of an example an information structure 223 that includes an example hash table 225 and an associated storage status information structure 227. The hash table 225 stores hash values H0-HN. The hash logic 220 produces example the hash values H0-HN, based upon hash keys $K_0$-$K_N$. The example hash values H0-HN indicate common memory addresses within memory devices $230_0$-$230_{15}$. Specifically, each of memory devices $230_0$-$230_{15}$ includes a common memory address H0; each of memory devices $230_0$-$230_{15}$ includes a common memory address H1; each of memory devices $230_0$-$230_{15}$ includes a common memory address H2; etc. In an example memory module $204_1$ implemented using RAM memory devices $230_0$-$230_{15}$, the memory locations include wordlines, and the example hash values, H0-HN, indicate wordline addresses (e.g., wordlines $line_{H0}$-$line_{HN}$) within memory devices $230_0$-$230_{15}$. In an example memory module $204_1$ implemented using RAM memory devices $230_0$-$230_{15}$, an example hash value H1, which is produced using the hash logic 220, based upon an example key value $K_1$, indicates a common wordline $line_{H1}$ within the memory devices $230_0$-$230_{15}$.

An example storage status information structure 227 indicates storage storage activity status at multiple example memory address locations H0-HN, of the multiple memory devices $230_0$ to $230_{15}$. More particularly, the storage status information structures $227_{H0}$-$227_{HN}$ act as indexes to access content data storage status information for individual memory devices at different memory address locations within the multiple memory devices $230_0$-$230_{15}$. An example storage address status information structure 227 indicates storage status for common memory addresses at each of multiple memory devices. An example storage status information structure 227 includes multiple example storage status information structures $227_{H0}$-$227_{HN}$. Each of storage status information structures $227_{H0}$-$227_{HN}$ corresponds to a different hash value, and as explained above, each hash value corresponds to a memory address location within memory devices $230_0$-$230_{15}$. The example storage status information structures $227_{H0}$ corresponds to hash value H0; the example storage status information structures $227_{H1}$ corresponds to hash value H1; the example storage status information structures $227_{H2}$ corresponds to hash value H2; etc.

In an example memory module $204_1$, each respective storage status information structures $227_{H0}$-$227_{HN}$ comprises a respective table structure that includes a different corresponding row for each respective memory device $230_0$-$230_{15}$. The example storage status information structures $227_{H0}$-$227_{HN}$ store respective storage activity status information in the form of activity bits that correspond to respective memory devices. The activity bits have logical values that indicate whether content data, e.g., a key and a corresponding rule, currently is stored at a corresponding memory device. Thus, respective storage status information structures $227_{H0}$-$227_{HN}$ correspond to respective common memory addresses within memory devices $230_0$-$230_{15}$, and the activity bits within the storage status information structures $227_{H0}$-$227_{HN}$ indicate storage status at individual memory addresses within individual memory devices.

In an example storage status information structure 227, a first common address information structure $227_{H0}$ is associated in memory 221 with a common memory address H0 indicated within the hash table 225. The first common address information structure $227_{H0}$ provides an indication of which, if any, memory devices $230_0$-$230_{15}$ currently have content data stored at a common memory address indicated by the first hash value H0, e.g., at a memory address wordline, $line_{H0}$. An example first common address information structure $227_{H0}$ includes a first table that includes a different corresponding storage activity status information $Ab0_0$-$A0_{15}$ for each of memory devices $230_0$ to $230_{15}$. Storage activity status information values indicate whether content data currently is stored at a common memory address corresponding to the first hash value H0 within memory devices $230_0$ to $230_{15}$. More specifically, for example, storage activity status information $A0_0$ within the first common address information structure $227_{H0}$ that corresponds to the first memory device $230_0$ indicates whether content data currently is stored at a common memory address indicated by the first hash value H0, e.g., at an example wordline, $line_{H0}$, within the first memory device $230_0$.

Similarly, a second common address information structure $227_{H1}$ is associated in memory 221 with a second common memory address H1 indicated within the hash table 225. The second common address information structure $227_{H1}$ provides an indication of which, if any, memory devices $230_0$-$230_{15}$ currently have content data stored a memory address corresponding to the second hash value H1. An example second common address information structure $227_{H1}$ includes a second table that includes a different corresponding storage activity status information $A1_0$-$A1_{15}$ for each of memory devices $230_0$ to $230_{15}$. For example, activity information $A1_1$ within the second common address information structure $227_{H1}$ that corresponds to the second memory device $230_1$ indicates whether content data currently is stored at a common memory address within the second memory device $230_1$ indicated by the second hash value H1, e.g., at an example wordline, $line_{H1}$, within the second memory device $230_1$.

Third through Nth common address information structures $227_{H2}$ to $227_{HN}$ are arranged similarly to the first and second common address information structures $227_{H0}$-$227_{H1}$. Therefore, for economy of disclosure, the third through Nth common address information structures $227_{H2}$ to $227_{HN}$ will not be separately described.

Figure 5A:
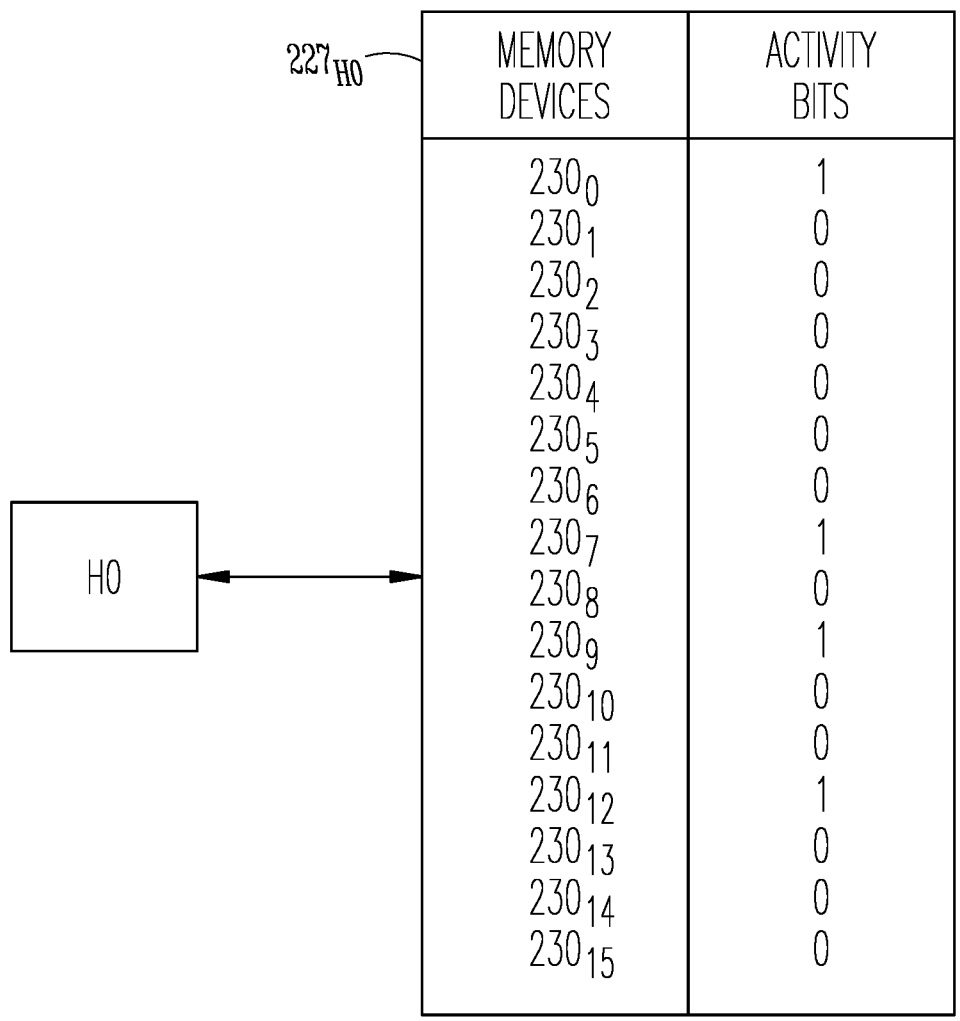
FIG. 5A is an illustrative drawing showing example activity bit values within common address information structure indicating content data storage status corresponding to a common memory address at each of multiple memory devices.
Figure 5B:
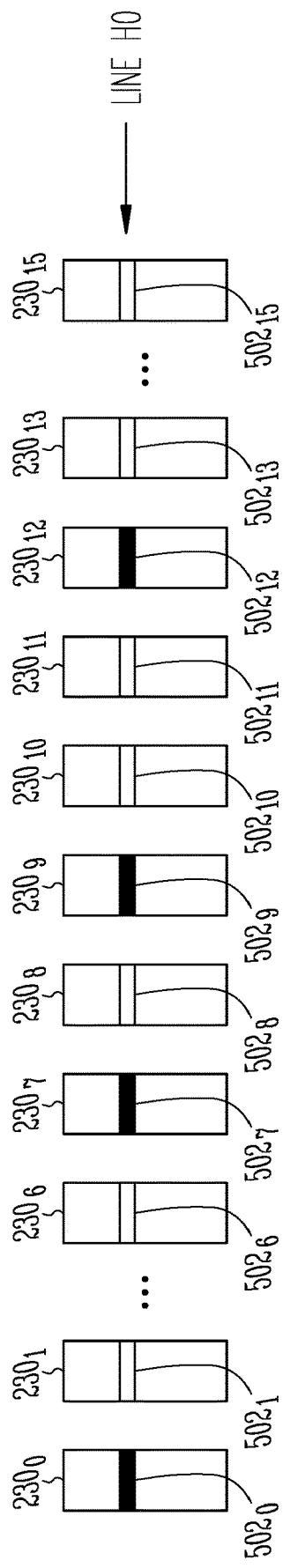
FIG. 5B is an illustrative drawing indicating current content data storage within the multiple memory storage devices at the common memory address of FIG. 5A.

FIG. 5A is an illustrative drawing showing example storage activity status information implemented as activity bit values within a first common address information structure $227_{H0}$. FIG. 5B is an illustrative drawing representing memory devices $230_0$ to $230_{15}$ and indicating current content data storage at an example first common memory address associated with the common address information structure $227_{H0}$. In the example common address information structure $227_{H0}$ in FIGS. 5A-5B, the common address locations are wordlines, and the first address location is a first wordline $line_{H0}$, and an storage activity status value logic 0 indicates that no content data currently is stored at memory location $line_{H0}$, and an activity value logic 1 indicates that content currently is stored at memory location $line_{H0}$. The storage activity status values of the example first common address information structure $227_{H0}$ indicate that content data currently is stored at memory location $line_{H0}$ only in memory devices $230_0$, $230_7$, $230_9$, and $230_{12}$ since only rows corresponding to these memory devices include a logic value 1 storage activity status value. The rows corresponding to the other memory devices have a logic value 0 storage activity status value indicating that none of these other rows have content data stored at memory location $line_{H0}$.

Referring to FIG. 5B, each respective memory devices $230_0$ to $230_{15}$ includes a respective first memory common memory locations $502_0$ to $502_{15}$ having the first common memory address, $line_{H0}$. The shaded matching memory locations $502_0$, $502_7$, $502_9$, and $502_{12}$ indicate that content data currently is stored at memory address line H o in memory devices $230_0$, $230_7$, $230_9$, and $230_{12}$. The non-shaded matching memory address locations $502_1$-$502_6$, $502_8$, $502_{10}$-$502_{11}$, and $502_{13}$-$502_{15}$ indicate that no content data currently is stored at memory address line H o in memory devices $230_1$-$230_6$, $230_8$, $230_{10}$-$230_{11}$, and $230_{13}$-$230_{15}$. The shaded matching memory locations $502_0$, $502_7$, $502_9$, and $502_{12}$ correspond to rows of the first common address information structure $227_{H0}$ that correspond to memory devices $230_0$, $230_7$, $230_9$, and $230_{12}$ for which storage activity status bits have value logic 1, indicating that content data currently is stored. Conversely, the non-shaded matching memory locations $502_1$-$502_6$, $502_8$, $502_{10}$-$502_{11}$, and $502_{13}$-$502_{15}$ correspond to rows of the first common address information structure $227_{H0}$ that correspond to memory devices $230_1$-$230_6$, $230_8$, $230_{10}$-$230_{11}$, and $230_{13}$-$230_{15}$ for which storage activity status bits have value logic 0, indicating that no content data currently is stored.

Figure 6:
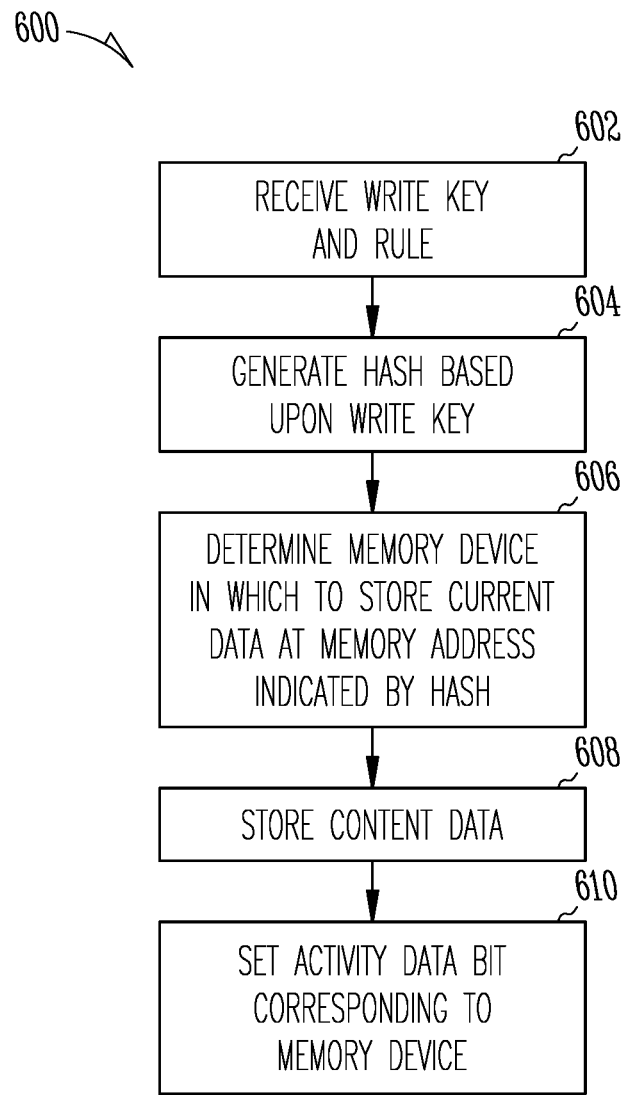
FIG. 6 is an illustrative flow diagram representing a process to write information to memory devices within the TCAM system of FIG. 3B.

FIG. 6 is an illustrative flow diagram representing a process 600 during write mode of the memory module $204_1$, to write information to a memory device. The memory controller 224 to implement operations of the example virtual module write process 600. Referring to FIG. 3B and to FIG. 6, at operation 602, a key value (K) is received at an interface $210_1$ and Rule information (R) is received at an interface $210_2$. An example interfaces $210_1$ and $210_2$ include temporary buffer circuits (not shown) to temporarily store information. At operation 604, the hash logic 220 generates a hash value in response to a key value received at interface $210_1$ and stores the hash value within the hash table 225. The hash value corresponds to a common memory address present within memory devices $230_1$-$230_{15}$, such as a respective wordlines $235_0$-$235_{15}$ within respective memory devices $230_1$-$230_{15}$. At operation 606, an example memory controller 224 determines a memory device from among memory devices $230_1$-$230_{15}$ in which to store the write key value and the rule, based upon availability for storage indicated by one or more storage activity status bits. For example, the operation 606 may determine to store the key and associated rule at wordline $235_1$ in memory device $230_1$. Operation 608 stores the received content data within the selected storage memory device at the memory address corresponding to the write hash value. Operation 610 adjusts an storage activity status bit, within the storage status information structure 227, to a logic value (e.g., logic value 1) to indicate that content data currently is stored within the selected storage memory device at the memory address corresponding to the generated write hash value. A key and a corresponding rule may be referred to collectively herein as a "content data".

It is noted that a storage activity status bit can indicate that a memory address location does not store current data even when data is present at that location if for example, that data no longer is current and is eligible to be overwritten.

Figure 7:
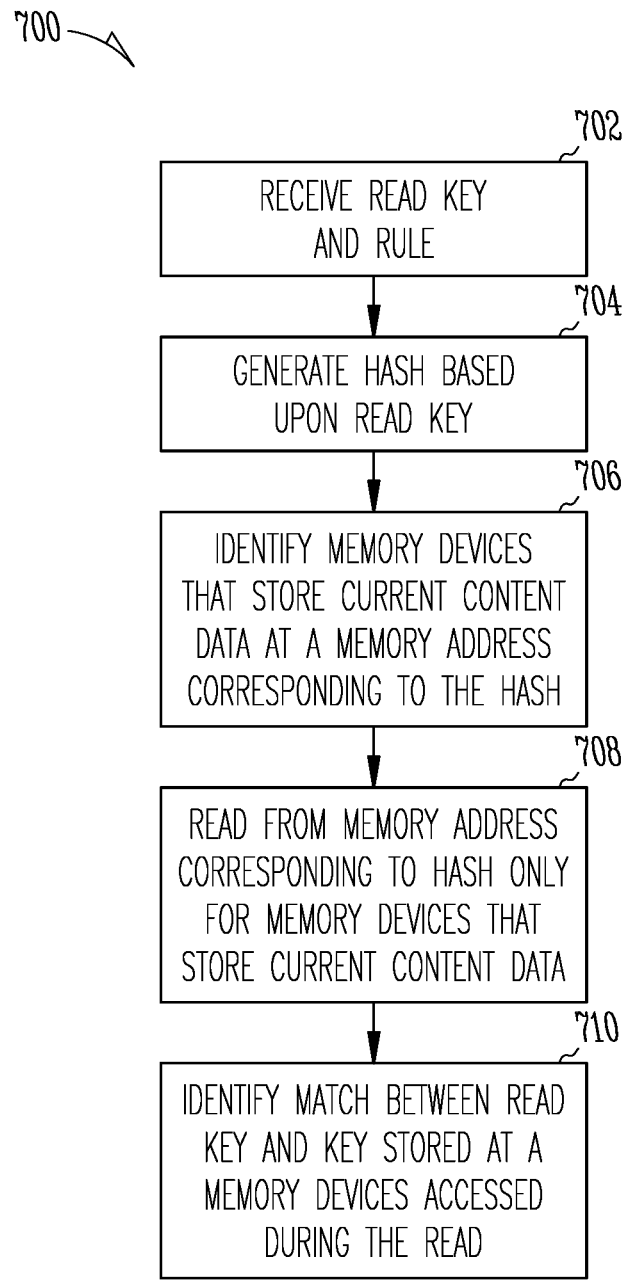
FIG. 7 is an illustrative flow diagram representing a process to read information from memory devices within the TCAM system of FIG. 3B.

FIG. 7 is an illustrative flow diagram representing a process 700 during a read mode of the memory module $204_1$, to read information from a memory. The memory controller 224 can be programmed with executable instructions to perform operations of the read process 700. Referring to FIG. 3B and to FIG. 7, at operation 702, a key value is received at the key interface $210_1$. At operation 704, the hash logic 220 generates a hash value in response to a key value received at the key interface $210_1$. As explained above, the hash value corresponds a common memory address within memory devices $230_1$-$230_{15}$, such as a respective wordlines $235_0$-$235_{15}$ within respective memory devices $230_1$-$230_{15}$. At operation 706, the memory controller 221 determines based upon a value of storage activity status information within the storage status information structure 227, which if any, memory devices store current content data at a memory address corresponding to the read hash value. At operation 708, the memory controller 221 causes read access of content data from the memory address location corresponding to the read hash value, only for those memory devices that the storage activity status information indicate to be storing current content data. Thus, there is no read for corresponding address from memory devices that does not store current content data. Reading only from memory devices that do store current content data saves energy and can limit heat buildup within the memory module $204_1$. At operation 710, one or more output buffer circuits $240_0$-$240_{15}$ receive content data output from a memory address that stores current content data. The content data includes key information and corresponding rule information. One or more of comparators $250_0$-$250_{15}$ receive respective key information from corresponding buffers $240_0$-$240_{15}$, depending upon which ones of memory devices $230_0$-$230_{15}$ store current content data. The one or more comparators $250_0$-$250_{15}$ compare respective keys received from corresponding buffers $240_0$-$240_{15}$ with the read key and provide an indication of whether there is a match. A comparator that detects a match sends a match signal on a corresponding match line, which causes a corresponding output buffer to provide a corresponding rule accessed during the read as output information to the network processor 110. For example, assuming that a first comparator $250_0$ determines that a first stored key $K_0$ matches the received read key, then the first comparator $250_0$ provides a match signal on match line $M_0$ that causes the first output buffer $240_0$ to provide a first stored rule $R_0$ on output line $O_0$ to the network processor 110. In an example memory module $204_1$, one or both of the hash logic 220 and the memory controller 224 can be implemented in software in the computing machine 180.

The above description is presented to enable any person skilled in the art to create and use an algorithmic content addressable memory that uses current content storage status information to determine memory devices to read. Various modifications to the examples will be readily apparent to those skilled in the art, and the generic principles defined herein may be applied to other examples and applications without departing from the spirit and scope of the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the spirit and scope of the invention, which is defined in the appended claims.

The invention claimed is:

1. A content addressable memory circuit comprising:
an interface to receive a key value;
multiple integrated circuit memory devices that share common memory address locations that are coupled for simultaneous access;
hash logic operative to determine a hash value, based upon the received key value, that corresponds to a common memory address location of the memory devices;
a non-transitory storage device that includes,
a hash information structure that stores multiple hash values determined using the hash logic, wherein the hash information structure associates each hash value with a corresponding common memory address location of the memory devices; and
an activity status information structure that stores information that indicates, for multiple common memory address locations for each memory device, whether the memory device stores content data at the common memory address location; and
memory controller logic to perform operations comprising:
in a read mode,
in response to the hash logic generating a hash value based upon a received key value, wherein the generated hash value is one of the hash values stored in the hash information structure, selecting one or more memory devices from which to output stored content data from a common memory address location that is associated with the hash value that is generated by the hash logic, based upon information stored in the storage activity status information structure for the common memory address location that is associated with the hash value that is generated by the hash logic; and
causing the selected one or more memory devices to output respective stored content data.

2. The content addressable memory of claim 1 further including:
comparator circuitry coupled to compare at least a portion of the content data output for each selected one or more memory devices with the received key value.

3. The content addressable memory of claim 1,
wherein the storage activity status information indicates for common memory address locations of memory devices, whether current content data is stored.

4. The content addressable memory of claim 1,
wherein the memory controller includes one or more processors; and
non-transitory memory including instructions incorporated into the non-transitory memory, the instructions configuring the one or more processors to implement the memory controller logic to perform the operations.

5. The content addressable memory of claim 1 further including:
in a write mode,
causing a memory device to store the received key value at the corresponding common memory address location; and
adjusting storage activity status information for the corresponding common memory address location for the memory device in which the key value is stored.

6. The content addressable memory of claim 5 further including:
comparator circuitry coupled to compare at least a portion of the content data that is output for each selected one or more memory devices with the received key value.

7. The content addressable memory of claim 5,
wherein the storage activity status information indicates for multiple common memory address locations of each memory device, whether current content data is stored.

8. The content addressable memory of claim 1,
wherein the common memory address locations comprise word lines addresses.

9. A method to control a content addressable memory that includes multiple integrated circuit memory devices that share common memory address locations and that are coupled for simultaneous access to the common memory address locations, the method comprising:

storing in a non-transitory storage device,
a hash information structure that stores multiple hash values determined using the hash logic, wherein the hash information structure associates each hash value with a corresponding common memory address location of the memory devices; and an activity status storage status information structure that stores information that indicates, for multiple common memory address locations for each memory device, whether the memory device stores content data at the common memory address location;

receiving a key value;

generating determining, a hash value using the hash logic, based upon the received key value, wherein the generated hash value is one of the hash values stored in the hash table;

selecting one or more of the memory devices from which to output stored content data from a common memory address location that is associated with the hash value that is generated by the hash logic, based upon information stored in the storage activity status information structure for the common memory address location that is associated with the hash value that is generated by the hash logic; and causing the selected one or more memory devices to output stored content data.

10. The method of claim 9, further including:
comparing at least a portion of the content data output for each selected one or more memory devices with the received key value.

11. The method of claim 9,
wherein the storage activity status information indicates for common memory address locations of memory devices, whether current content data is stored.

12. The method of claim 9,
wherein the common memory address locations comprise word lines addresses.

13. A method to control a content addressable memory that includes multiple integrated circuit memory devices that share common memory address locations and that are coupled for simultaneous access to the common memory address locations, the method comprising:

storing in a non-transitory storage device,
a hash information structure that stores multiple hash values determined using the hash logic, wherein the hash information structure associates each hash value with a corresponding common memory address location of the memory devices; and an activity status storage status information structure that stores information that indicates, for multiple common memory address locations for each memory device, whether the memory device stores content data at the common memory address location;

receiving a key value;

generating a hash value using the hash logic, based upon the received key value, wherein the generated hash value is one of the hash values stored in the hash table;

storing the received key value in at least one of the integrated circuit memory devices at a common memory address location that is associated with the hash value that is generated by the hash logic; and adjusting information stored in the storage activity status information structure for the common memory address location at which the key value is stored, to indicate which at least one of the integrated circuit memory devices stores the received key value.

14. The method of claim 13,
wherein the storage activity status information indicates for common memory address locations of memory devices, whether current content data is stored.

15. The method of claim 13,
wherein the common memory address locations comprise word lines addresses.

* * * * *